US012642395B2

(12) United States Patent
Zhang et al.

(10) Patent No.: US 12,642,395 B2
(45) Date of Patent: Jun. 2, 2026

(54) MASSAGE CHAIR FOR BATHING

(71) Applicant: Kohler (China) Investment Co., Ltd., Shanghai (CN)

(72) Inventors: Hua Zhang, Shanghai (CN); Feixiang Chen, Shanghai (CN); Yanchao Shen, Shanghai (CN); Xinyao Liu, Shanghai (CN); Jianqing Zhang, Shanghai (CN)

(73) Assignee: Kohler (China) Investment Co., Ltd, Shanghai (CN)

( * ) Notice: Subject to any disclaimer, the term of this patent is extended or adjusted under 35 U.S.C. 154(b) by 307 days.

(21) Appl. No.: 18/467,265

(22) Filed: Sep. 14, 2023

(65) Prior Publication Data

US 2024/0090709 A1 Mar. 21, 2024

(30) Foreign Application Priority Data

Sep. 15, 2022 (CN) ......................... 202222448043.9
Sep. 15, 2022 (CN) ......................... 202222464993.0

(51) Int. Cl.
*A47K 3/022* (2006.01)
*A61H 33/00* (2006.01)

(52) U.S. Cl.
CPC ......... *A47K 3/022* (2013.01); *A61H 33/6089* (2013.01); *A61H 2201/0134* (2013.01); *A61H 2201/0149* (2013.01)

(58) Field of Classification Search
CPC ................ A47K 3/022; A61H 33/6089; A61H 2201/0134; A61H 2201/0149
USPC ................ 297/284.1–284.11, 440.14, 440.15
See application file for complete search history.

(56) References Cited

U.S. PATENT DOCUMENTS

| | | | | | |
|---|---|---|---|---|---|
| 4,780,916 | A * | 11/1988 | Sutton | A61H 33/60 601/168 |
| 5,010,605 | A * | 4/1991 | Shiina | A61H 33/0087 4/488 |
| 6,212,719 | B1 * | 4/2001 | Thomas | A47C 27/081 601/149 |
| 11,672,347 | B1 * | 6/2023 | Wu | A47C 7/42 297/440.15 |
| 2011/0068613 | A1 * | 3/2011 | Breitkreuz | A47C 7/42 297/440.15 |
| 2011/0285189 | A1 * | 11/2011 | Petzel | B60N 2/667 297/284.1 |
| 2022/0054351 | A1 * | 2/2022 | Liu | A61H 33/6089 |

FOREIGN PATENT DOCUMENTS

| | | | | |
|---|---|---|---|---|
| CA | 2285594 A1 | * | 10/1998 | A61H 23/0245 |
| CN | 202128135 U | * | 2/2012 | |
| CN | 110859742 A | * | 3/2020 | A61H 7/007 |
| EP | 396112 A | * | 11/1990 | |

* cited by examiner

*Primary Examiner* — Jose V Chen
(74) *Attorney, Agent, or Firm* — Foley & Lardner LLP

(57) ABSTRACT

A massage chair for bathing includes a chair seat, a seat back, and a massage device. The massage device is positioned on at least one of the chair seat and the seat back, where the seat back and the chair seat are connected using a locking unit.

19 Claims, 7 Drawing Sheets

MASSAGE CHAIR FOR BATHING

CROSS-REFERENCE TO RELATED PATENT APPLICATIONS

China Priority Application 202222464993.0, filed Sep. 15, 2022 including the specification, drawings, claims and abstract, is incorporated herein by reference in its entirety. China Priority Application 202222448043.9, filed Sep. 15, 2022 including the specification, drawings, claims and abstract, is incorporated herein by reference in its entirety.

BACKGROUND

The present application relates generally to the field of bathing products, and particularly to a massage chair for bathing. Bathtubs with massage function are considered high-end sanitary equipment with the advantage of a better bathing experience, and are increasingly favored by consumers. Generally, bathtubs with massage function comprise a bathtub body, which includes nozzles, bubble spouts, and other devices with massage function. However, massage devices that are integrally formed on bathtubs make it difficult to clean the bathtubs.

Some devices have a massage chair removably installed in the bathtub, and the massage chair may be integrated with back massage function, shoulder and neck massage functions, etc. so that users may experience a back massage while bathing. These massage chairs may be removed to clean the tub and may be used in other environments, however, these massage chairs are heavy which makes it labor-intensive to install or remove. Additionally, since the massage chair is at least partially submerged in the water in the bathtub when it is used, the requirement for the sealing is high. Also, the height of the shoulder and neck massage pillow of the existing massage chair is not adjustable and thus may not be conducive to users with different heights.

SUMMARY

One embodiment relates to a massage chair for bathing that includes a chair seat, a seat back, and a massage device. The massage device is positioned on at least one of the chair seat and the seat back, where the seat back and the chair seat are connected using a locking unit.

Another embodiment relates to a massage chair that includes a massage chair body, a supporting base, a supporting base drive device, and a massage pillow. The supporting base is slidably connected to the massage chair body. The supporting base drive device drives the supporting base to move up and down. The massage pillow is removably connected to the supporting base.

This summary is illustrative only and is not intended to be in any way limiting. Other aspects, inventive features, and advantages of the devices or processes described herein will become apparent in the detailed description set forth herein, takin gin conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
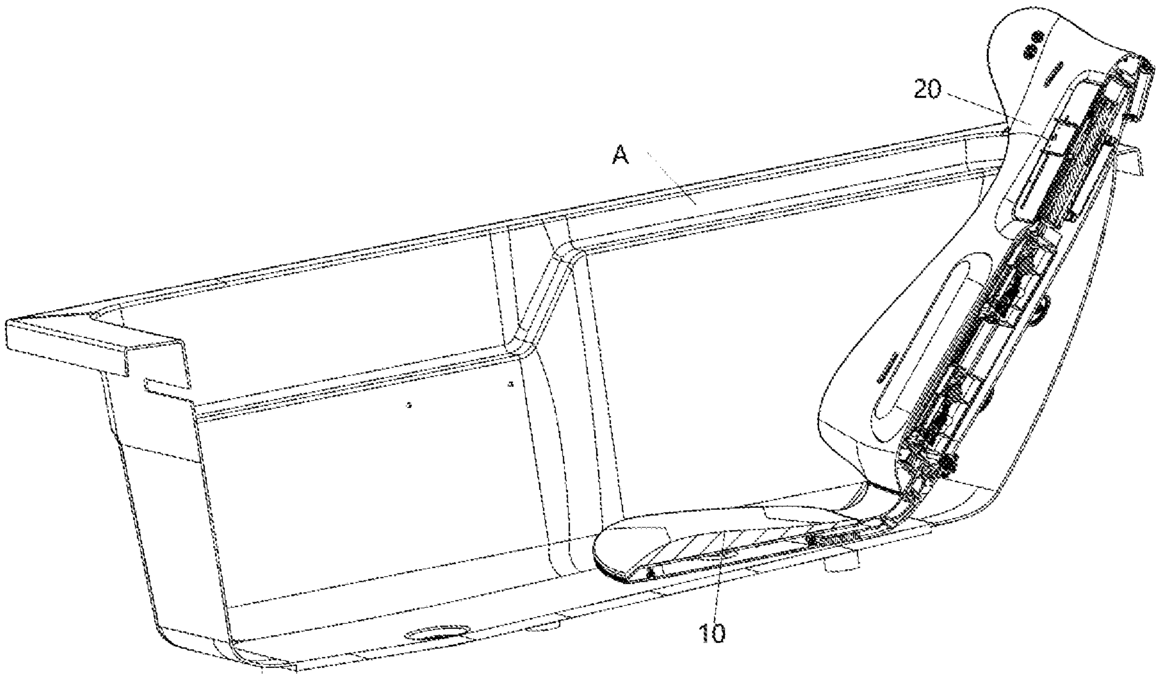
FIG. 1 is a perspective view of a massage chair for bathing mounted in a bathtub, according to an exemplary embodiment.

Before turning to the FIGURES, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, an exemplary embodiment of a massage chair may include a chair seat and a seat back with a massage device provided on the chair seat and/or the seat back. The seat back and the chair seat may be coupled together and may be connected through a locking unit. In some embodiments, a protrusion may be provided on the chair seat and a depression may be provided on the seat back. The protrusion and the depression may be configured to couple together to couple the chair seat and the seat back. In some embodiments, the protrusion and the depression may have holes respectively, and when the chair seat and the seat back are assembled together, the hole of the protrusion and the hole of the depression may be arranged coaxially. When the locking unit passes through both the hole of the protrusion and the hole of the depression, the chair seat and the seat back may be locked together. When the locking unit only passes through the hole of the depression, the chair seat and the seat back may be unlocked.

The locking unit may include a locking shaft, a resilient member, and a pulling twist part. The locking shaft may switch between a first position and a second position under the action of the resilient member and the pulling twist part. When the locking shaft is in the first position under the action of a force of the resilient member, the locking shaft may pass through the hole of the protrusion and the hole of the depression. When the locking shaft is in the second position under the pulling action of the pulling twist part, the locking shaft may be away from the hole of the protrusion.

The locking unit may be mounted on a rear side of the seat back on a mounting base. The pulling twist part may be slidably connected to the mounting base and fixedly connected to a first end of the locking shaft. The locking shaft may be inserted into the mounting base and a second end of the locking shaft may be provided with a connection collar. The resilient member may be a compression spring, and the compression spring may abut against the mounting base at one end and abut against the connection collar at the other end.

A connection suction disc may be provided on the seat back and on the back of the chair seat. The seat back and the chair seat may be connected to a side wall and a bottom wall of a bathtub via the connection suction disc. The connection suction disc may include a suction disc body and a first connection part provided on the suction disc body. The seat back and the back of the chair seat may include a second connection part. The first connection part and the second connection part may be connected through a bi-directional fastener located between the first connection part and the second connection part.

The seat back may include a seat back rear housing and a seat back front housing. The massage device may be located in a space between the seat back rear housing and the seat back front housing and may be connected to the seat back rear housing and/or the seat back front housing in a sealed manner. The massage device may comprise a massage core body. The massage core body may include at least one movable massage head. The massage core body may be connected to the seat back front housing by a fastening unit. A sealing gasket may be provided between the massage core body and the seat back front housing, and the sealing gasket may be covered on a front side of the massage core body.

The massage core body may include a connection frame. The connection frame may include a plurality of first connection holes. The sealing gasket may correspondingly include a sealing frame, and the sealing frame may correspondingly include a plurality of second connection holes. The back of the seat back front housing may include a plurality of third connection holes. The massage core body may be connected through fasteners that pass through a first connection hole, a second connection hole, and a third connection hole.

A supporting frame may be provided between the sealing gasket and the seat back front housing. The supporting frame may include a fourth connection hole. The fasteners may pass through the first connection hole, the second connection hole, the third connection hole, and the fourth connection hole to connect the massage core body to the seat back front housing in a sealed manner.

A portion of the massage head may protrude from the massage core body. The sealing gasket may include a raised accommodation area at a position corresponding to a moving area of the massage head. The seat back front housing may include a sliding channel at a position corresponding to the moving area of the massage head, and the raised accommodation area may pass through the sliding channel.

The massage chair may be removably mounted in the bathtub to facilitate the user to selectively use the massage chair according to different needs. Additionally, the seat back and the chair seat of the massage chair may be removably connected so that the seat back and the chair seat may be assembled and disassembled independently to avoid the problem that users may not be able to independently install the massage chair due to its overall weight. Further, the seat back and the chair seat may be removably connected by coupling them together using a locking unit. The user may not need to use additional tools to achieve assembly and disassembly making the assembly and disassembly of the massage chair easier and more convenient.

In another exemplary embodiment, a massage chair may include a massage chair body, a supporting base slidably connected to the massage chair body, a supporting base drive device for driving the supporting base to move up and down, and a massage pillow removably connected to the supporting base. A massage chair mounting area may be provided on a seat back of the massage chair body. The massage chair mounting area may include a slide channel extending in a vertical direction. A slide bar may be positioned on a back of the supporting base, where the slide bar may be connected through the slide channel to an output end of the supporting base drive device located on the inside of the massage chair mounting area.

The supporting base drive device may include a drive motor and a leadscrew nut mechanism. An output shaft of the drive motor may be connected to a leadscrew of the leadscrew nut mechanism, and a nut of the leadscrew nut mechanism may be connected to the slide bar. The supporting base may have a first hook member, and the back of the massage pillow may include a second hook member. The second hook member may be hooked onto the first hook member and connected by a fastener.

The massage pillow may include a massage pillow housing, a massage machine core located within the massage pillow housing, and a connection plate removably coupled to a back of the massage pillow housing. The connection plate may be connected to the supporting base. The massage pillow may also include a sealing gasket, where the sealing gasket may be covered by at least a portion of the massage pillow housing. The massage pillow housing may include a front cover and a back cover that are removably connected to each other, and the sealing gasket may be covered by the front cover and hermetically connected with the back cover. An end of the sealing gasket may form an annular sealing groove. An annular projection may be formed on the back cover, where the annular projection may be inserted into the annular sealing groove.

The massage machine core may include at least one massage head. The front cover may have a hole at an area corresponding to the massage head, where the massage head protrudes through the hole of the front cover. The sealing gasket may have an accommodation area protruding forward at an area corresponding to the massage head, where a portion of the massage head is located in the accommodation area.

The massage chair body may be removably installed in a bathtub. In some embodiments, the massage pillow on the massage chair may be mounted and removably coupled to the massage chair which may allow for easy assembly and disassembly. By mounting the massage pillow on the supporting base so that the massage pillow may slide up and down along the massage chair body and by supporting the massage chair by the supporting base, the position of the massage pillow in the up and down directions can be adjusted which makes it convenient for users of different heights to use the massage pillow which makes the design more user-friendly.

Referring to FIG. 1, an exemplary embodiment of a massage chair for bathing (hereinafter referred to as massage chair) may be removably mounted in the bathtub A and may be at least partially submerged in water in the bathtub A when in use, and the user may sit on the massage chair to enjoy the massage while bathing. The massage chair may include a chair seat 10 and a seat back 20. The chair seat 10 and/or the seat back 20 may include a massage device 30. The seat back 20 and the chair seat 10 may couple together using a locking unit 40 (shown in FIG. 4). The massage chair may be removably installed in the bathtub A to facilitate the user selectively using the massage chair. The seat back 20 and the chair seat 10 may be removably connected together, which may achieve independent assembly and disassembly of the chair seat 10 and the seat back 20 and may avoid the problem that users may not be able to independently assemble it due to the large overall weight. Further, using the locking unit 40 to achieve removable connection between the seat back 20 and the chair seat 10 may improve the convenience of assembly and disassembly of the massage chair when compared with the general fastening screw connection method since other tools are not needed for assembly in this embodiment.

Figure 4:
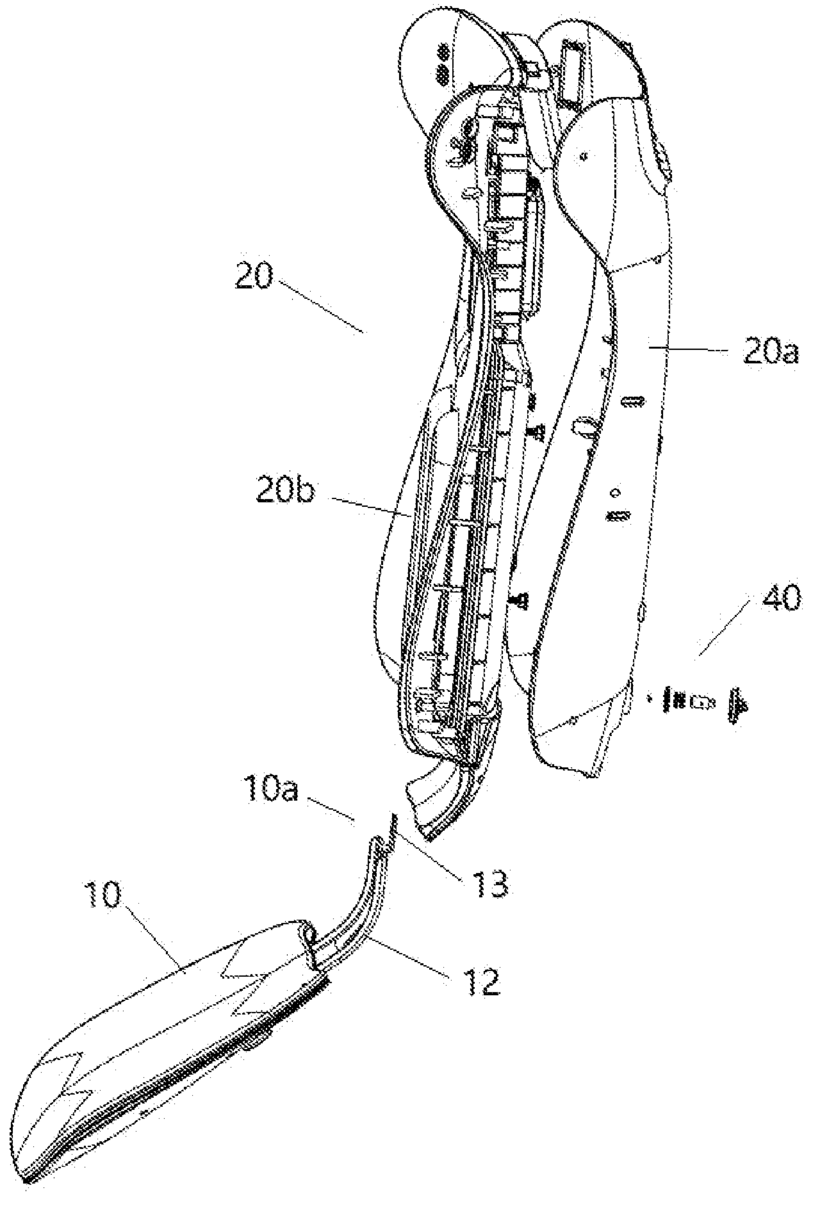
FIG. 4 is an exploded view of the massage chair of FIG. 1, according to an exemplary embodiment.

Specifically, referring to FIG. 4, the chair seat 10 may include a protrusion 10*a* and the seat back 20 may include a depression 22. The protrusion 10*a* and the depression 22 may cooperate to achieve the coupling of the chair seat 10 and the seat back 20. More specifically, the chair seat 10 may include a curved connection plate 12 at the end which may be connected to the seat back 20. The end of the curved connection plate 12 may also include a protrusion sheet 13. The seat back 20 may include a hole or groove at the end that may be connected with the chair seat 10. The protrusion sheet 13 and a portion of the curved connection plate 12 may form the protrusion 10a and may be inserted into the hole or groove to achieve the connection between the chair seat 10 and the seat back 20.

In order to achieve reliable locking of the seat back 20 and the chair seat 10 after connection, the protrusion 10*a* and the depression 22 may have holes, respectively. When the chair seat 10 and the seat back 20 are coupled, the hole 14 of the protrusion 10*a* and the hole 24 of the depression 22 may be arranged coaxially. When the locking unit 40 passes through both the hole 14 of the protrusion 10a and the hole 24 of the depression 22, the chair seat 10 may be locked with the seat back 20. When the locking unit 40 only passes through the hole 24 of the depression 22, the chair seat 10 may be unlocked from the seat back 20. The locking and unlocking of the chair seat 10 and seat back 20 may be achieved by controlling the locking unit 40 to switch between the two states.

Figure 2:
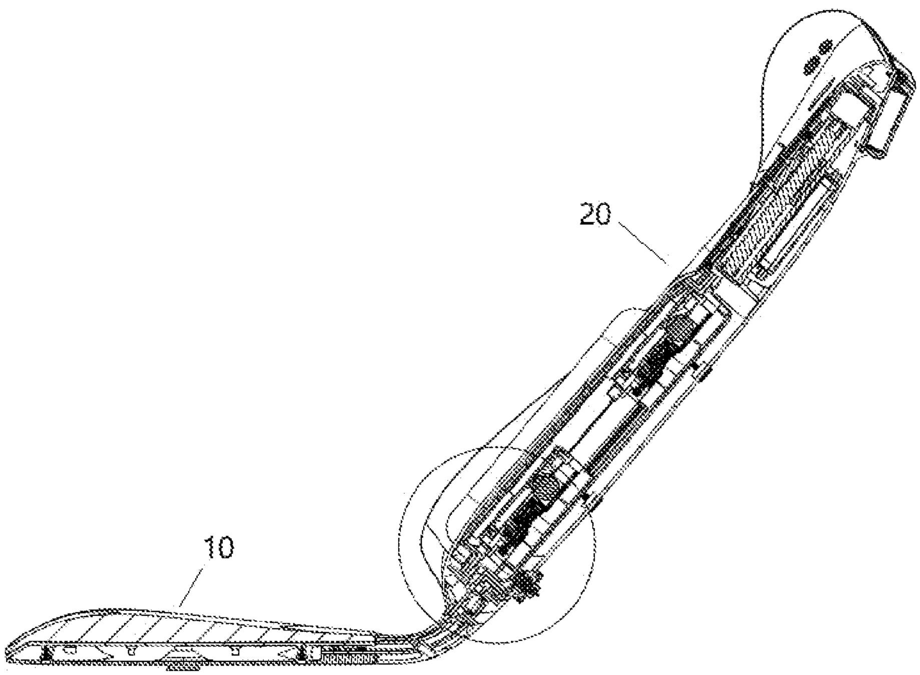
FIG. 2 is a side view of the massage chair of FIG. 1, according to an exemplary embodiment.
Figure 3:
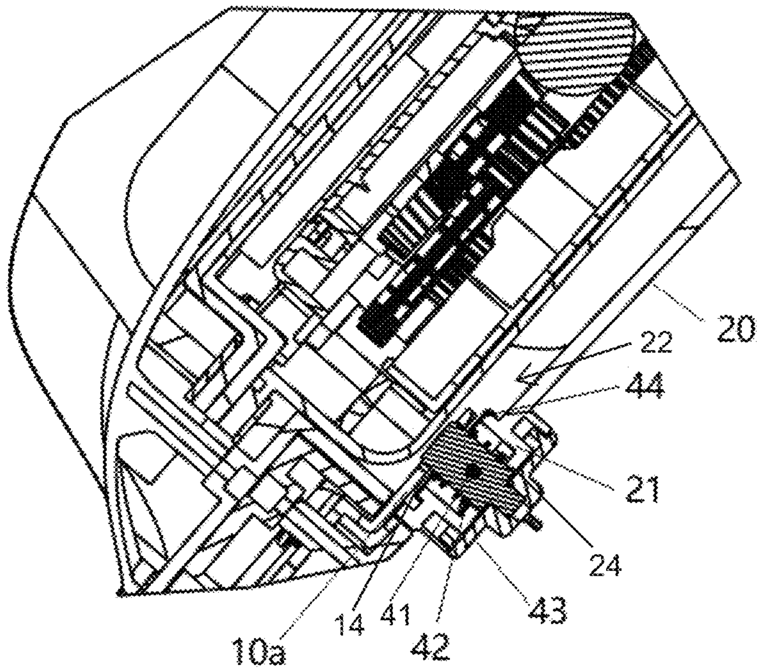
FIG. 3 is a detailed view of the massage chair of FIG. 1, according to an exemplary embodiment.

Referring to FIG. 2 and FIG. 3, the locking unit 40 includes a locking shaft 41, a resilient member 42, and a pulling twist part 43. The locking shaft 41 may switch between a first position and a second position under the action of the resilient member 42 and the pulling twist part 43. The resilient member 42 may provide a force towards the inner side of the seat back 20 to the locking shaft 41, and the locking shaft 41 may be in the first position under the action of the force of the resilient member 42. The locking shaft 41 may pass through the hole 12 of the protrusion 10*a* and the hole 24 of the depression 22 to lock the chair seat 10 and the seat back 20. The pulling twist part 43 may be fixedly connected to the locking shaft 41. The user may control the pulling twist part 43 to move it towards the outside of the seat back 20, and the locking shaft 41 may be in the second position under the force of the pulling twist part 43. The locking shaft 41 may be away from the hole 12 of the protrusion 10a to unlock the chair seat 10 from the seat back 20.

The locking unit 40 may be mounted on the back of the seat back 20, and the back of the seat back 20 may include a mounting base 21 which may include a mounting hole. The locking shaft 41 may be inserted in the mounting base 21 and may slide along the direction of the axis of the mounting hole. The pulling twist part 43 may be fixedly connected to the first end of the locking shaft 41 and slidingly connected to the mounting base 21. More specifically, the mounting base 21 may include a circular slide channel, and the pulling twist part 43 may have a slip ring that may fit with the circular slide channel to achieve a sliding connection between the pulling twist part 43 and the circular slide channel along the axial direction. The locking shaft 41 may include a connection collar 44 at a second end of the locking shaft 41. The resilient member 42 may be a compression spring where one end of the compression spring may abut against the mounting base 21 and the other end may abut against the connection collar 44. In the initial state, the force of the compression spring may be applied to the connection collar 44 so that the locking shaft 41 is located in a first position away from the mounting base 21. When the pulling twist part 43 is pulled outward, the locking shaft 41 may move towards the mounting base 21.

Figure 5:
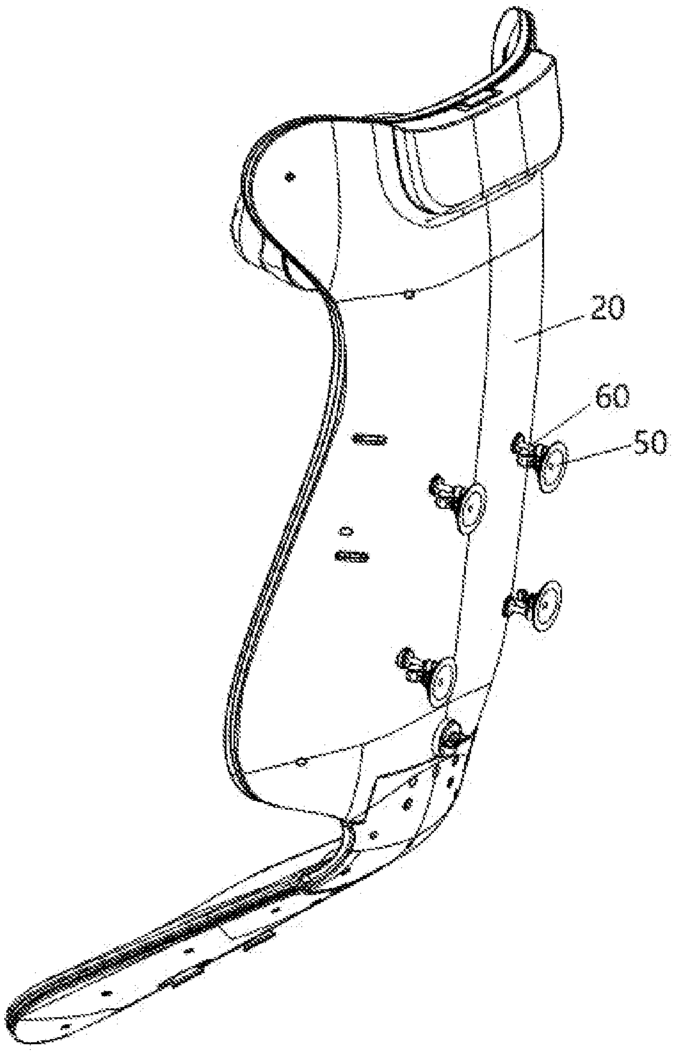
FIG. 5 is a perspective view of the massage chair of FIG. 1, according to an exemplary embodiment.

Referring to FIG. 5, the seat back 20 and the back of the chair seat 10 may include a connection suction disc 50, and the seat back 20 and the chair seat 10 may be connected to the side wall and bottom wall of the bathtub A through the connection suction disc 50.

Figure 6:
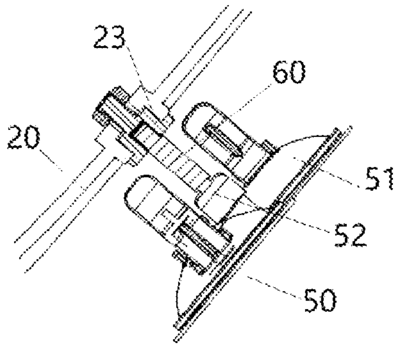
FIG. 6 is a detailed view of the massage chair of FIG. 1, according to an exemplary embodiment.

Referring to FIG. 6, the connection suction disc 50 may include a suction disc body 51 and a first connection part provided on the suction disc body 51. The seat back 20 and the back of the chair seat 10 may include a second connection part. The first connection part and the second connection part may be connected through the bidirectional fastener 60 located between the first connection part and the second connection part. Specifically, the first connection part on the suction disc body 51 may be formed as a first connection base 52 with a threaded hole. The second connection part on the seat back 20 and the chair seat 10 may be formed as a second connection base 23 with a threaded hole. The bidirectional fastener 60 may be formed as a bidirectional screw with external threads at each end, and the connection between the connection suction disc 50 and the seat back 20 or the chair seat 10 may be achieved by turning the bidirectional screw in a first direction. This connection structure may be used to attach the connection suction disc 50 to the bathtub A first, and then connect the seat back 20/chair seat 10 with the connection suction disc 50 through the bidirectional fastener 60 which may achieve a more convenient installation.

The method of installing the massage chair may include installing the chair seat 10 on the bottom wall of the bathtub A. In one embodiment, the connection suction disc 50 may be installed on the bottom of the chair seat 10 first, and then the chair seat 10 with the connection suction disc 50 may be directly adsorbed on the bottom of the bathtub A. In another embodiment, a user may first install the connection suction disc 50 on the bottom wall of the bathtub A, and then connect the chair seat 10 with the connection suction disc 50 through the bidirectional fastener 60. The method may also include installing a plurality of sets of connection suction discs 50 on the side wall of the bathtub A. The method may also include installing the seat back 20. When installing the seat back 20, the user may first pull the pulling twist part 43 outward so that the locking shaft 41 is in the second position. Then, the protrusion 10*a* of the chair seat 10 may be inserted into the depression 22 of the seat back 20. Thus, the pulling twist part 43 may be released and the locking shaft 41 may be reset to the first position under the action of the resilient member 42 so that the chair seat 10 and the seat back 20 are locked together. The method may also include connecting the seat back 20 to the connection suction disc 50 through the bidirectional fastener 60. The method of disassembling the massage chair may include disassembling the seat back 20 first and then disassembling the chair seat 10.

Figure 7:
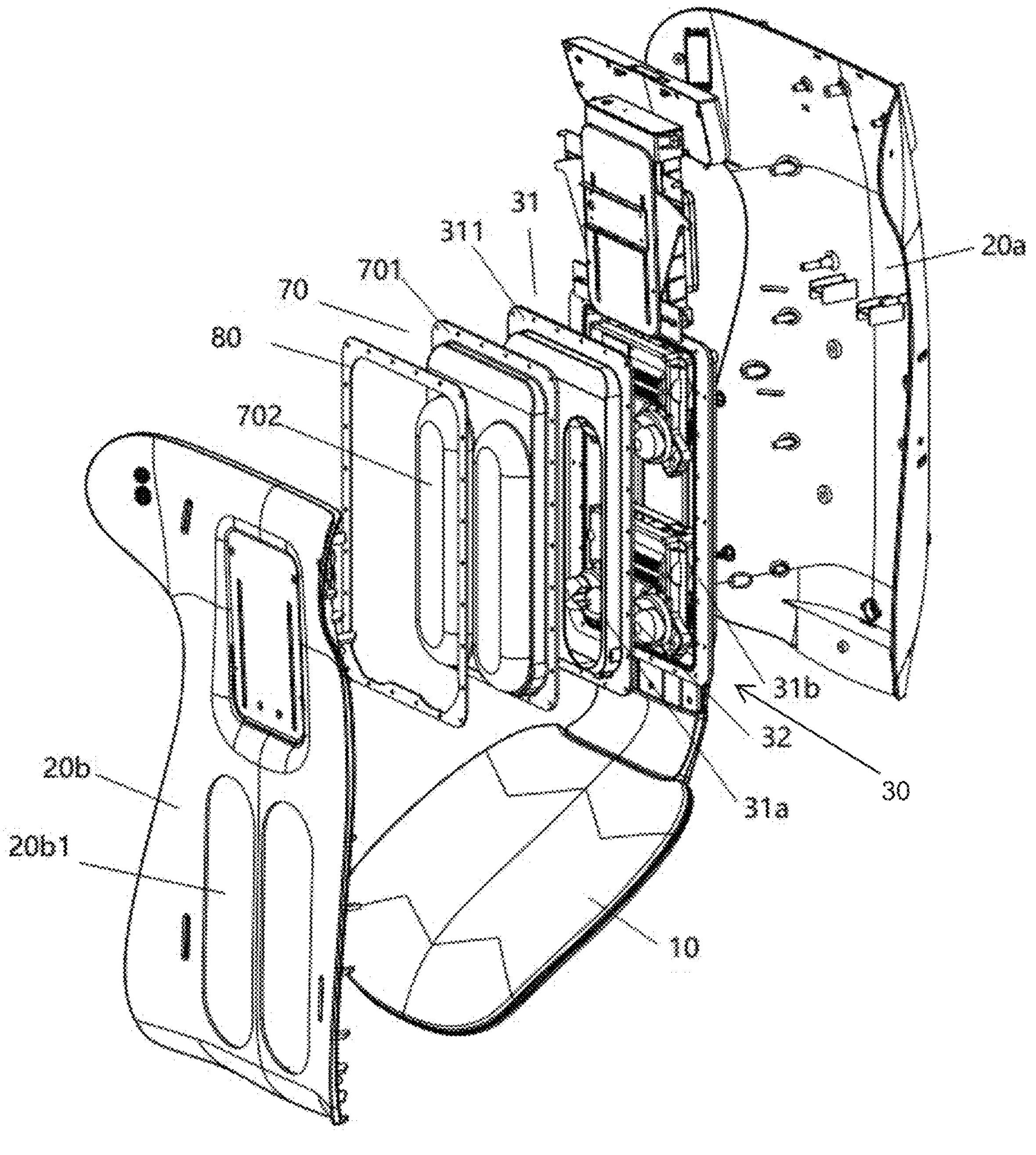
FIG. 7 is an exploded view of the massage chair of FIG. 1, according to an exemplary embodiment.

Referring to FIG. 7, the seat back 20 may include a seat back rear housing 20*a* and a seat back front housing 20*b*. The massage device 30 may be located in the accommodation space between the seat back rear housing 20*a* and the seat back front housing 20*b* and may be connected to the seat back rear housing 20*a* and/or the seat back front housing 20*b* in a sealed manner. In other embodiments, the massage device 30 may also be provided on the side of the chair seat 10. By connecting the massage device 30 and the seat back rear housing 20 and/or the seat back front housing 20*b* of the chair seat 10 in a sealed manner, it may be possible to prevent water in the bathtub A from entering the massage device 30 with electrical devices.

The massage device 30 may include a massage core body 31. The massage core body 31 may include at least one movable massage head 32. The massage head 32 may be rotated around its rotation axis under the action of the drive device as well as may move in the up and down or left and right direction. The massage core body 31 may be connected to the seat back front housing 20*b* through the fastening unit. The sealing gasket 70 may be provided between the massage core body 31 and the seat back front housing 20*b*, where the sealing gasket 70 may be covered by the front side of the massage core body 31. The sealing gasket 70 may be made of silicone and other sealing materials, and it may be covered by the front side of the massage core body 31. The front side of the massage core body 31 may be connected with the seat back front housing 20*b* which may achieve the fixed connection between the massage core body 31 and the seat back front housing 20*b* in a sealed manner and may avoid the water in the bathtub A entering the inside of the massage core body 31.

The massage core body 31 may include a core back cover 31*a* and a core front cover 31*b*. The massage head 32 may be positioned between the core back cover 31*a* and core front cover 31*b*, where the core front cover 31*b* may include a through hole suitable for allowing the massage head 32 to extend. The massage core body 31 may include a connection frame 311, and the connection frame 311 may include several first connection holes. The sealing gasket 70 may correspondingly include a sealing frame 701, where the sealing frame 701 may correspondingly include several second connection holes. The seat back front housing 20*b* may include several third connection holes (not shown in the figure) on its back. The massage core body 31 may be connected through the fasteners that pass through the first connection hole, the second connection hole, and the third connection hole.

To improve the reliability of the connection between the sealing gasket 70 and the seat back front housing 20*b*, a support frame 80 may be provided between the sealing gasket 70 and the seat back front housing 20*b*. The support frame 80 may be made of rigid material such as metal or hard plastic. The support frame 80 may include a fourth connection hole. The fasteners may pass through the first connection hole, the second connection hole, the third connection hole, and the fourth connection hole to connect the massage core body 31 to the seat back front housing 20*b* in a sealed manner.

A portion of the massage head 32 may protrude from the massage core body 31. The sealing gasket 70 may include a raised accommodation area 702 at a position corresponding to a moving area of the massage head 32. The part of the massage head 32 protruding from the massage core body 31 may extend into the raised accommodation area 702. The seat back front housing 20*b* may include a sliding channel 20*b*1 at a position corresponding to the moving area of the massage head 32. The raised accommodation area 702 with the massage head 32 inside may pass through the sliding channel 20*b*1.

Figure 8:
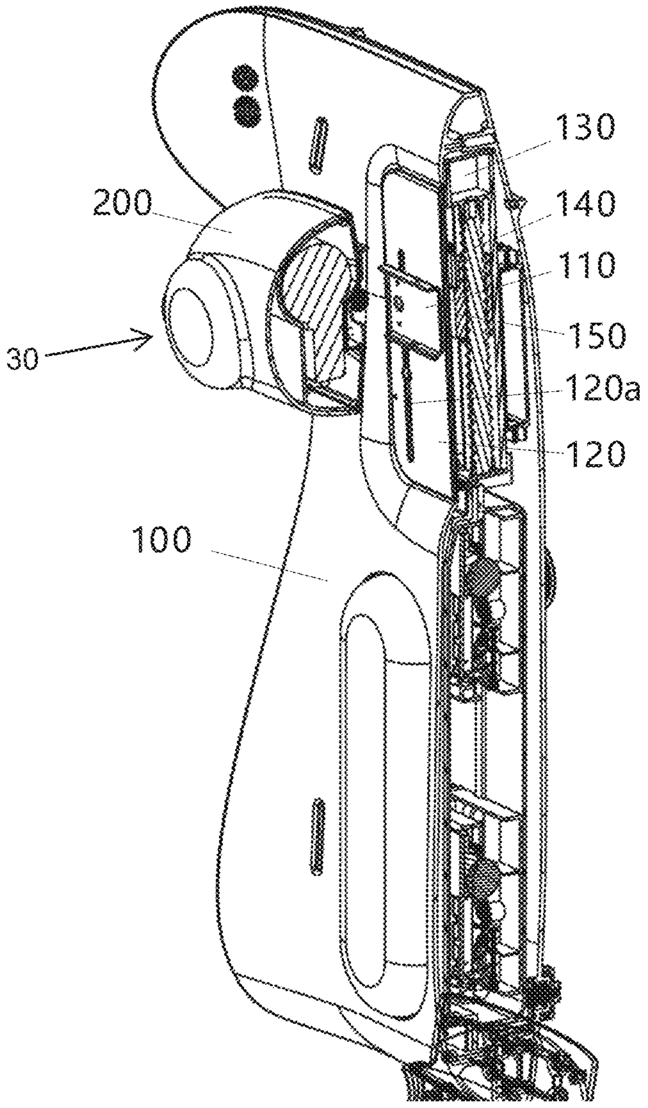
FIG. 8 is perspective view of a massage chair, according to an exemplary embodiment.

Referring to FIG. 8, another exemplary embodiment of a massage chair is illustrated. In this embodiment, the massage chair may be removably mounted in the bathtub and may be at least partially submerged in the water in the bathtub when in use so the user may sit on the massage chair to enjoy the massage while bathing. In other embodiments, the massage chair may also be removably mounted on a general chair or other support for sitting. The massage chair may include the massage device 30, a massage chair body 100, a supporting base 110 slidably connected to the massage chair body 100, a supporting base drive device for driving the supporting base 110 to move up and down, and a massage pillow 200 removably connected to the supporting base 110.

The massage pillow 200 may be removably mounted to the massage chair which may be convenient for users to selectively assemble and disassemble. The massage pillow may slide up and down along the massage chair body 100 so that the position of the massage pillow 200 in the up and down directions can be adjusted which may make it convenient for users of different heights to use the massage pillow. Additionally, the structural design of the massage pillow 200 may be more user-friendly.

A seat back of the massage chair body 100 may have a massage chair mounting area 120. Specifically, the massage chair mounting area 120 may be formed as a mounting plate mounted in an upper area of the seat back, which may include a slide channel 120*a* extending in a vertical direction. The slide channel 120*a* may pass through the inner and outer sides of the seat back. A back of the supporting base 110 may include a slide bar (not shown in the figure), where the slide bar is arranged through the slide channel 120*a* and may move up and down along the slide channel 120*a*. An inner side of the slide bar may be connected with an output end of the supporting base drive device located on an inside of the massage chair mounting area 120. More specifically, the mounting plate may include two parallel slide channels 120*a*, and both left and right sides of a back of the supporting base 110 may correspondingly include two slide bars in order to improve the moving stability of the supporting base 110.

The supporting base drive device is a drive assembly capable of outputting linear motion. Specifically, the supporting base drive device may include a drive motor 130 and a leadscrew nut mechanism. An output shaft of the drive motor 130 may be connected to a leadscrew 140 of the leadscrew nut mechanism, and a screw sleeve 150 of the leadscrew nut mechanism may be connected to the slide bar. The combination of the rotary drive motor 130 and the leadscrew nut mechanism may make the structure simple and reliable, and the cost may be relatively low. In other embodiments, the supporting base drive device may also be a linear motor and other drive devices with direct output linear motion to drive the supporting base 110.

The supporting base 110 may have a first hook member. The back of the massage pillow 200 may include a second hook member, where the second hook member is hooked on the first hook member and connected by a fastener unit. More specifically, the supporting base 110 may be formed as a support plate structure, where the upper and lower sides of the supporting plate have first bending edges to form a first hook member.

Figure 10:
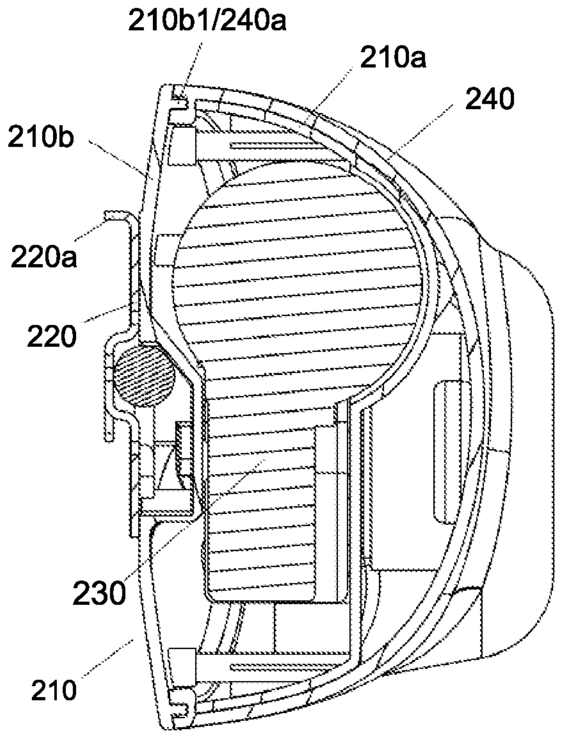
FIG. 10 is a sectional view of the massage chair of FIG. 8, according to an exemplary embodiment.

Referring to FIG. 8 and FIG. 10, the massage pillow 20 may include a massage pillow housing 210 and a connection plate 220. The connection plate 220 may be removably connected to a back of the massage pillow housing 210, and the upper and lower sides of the connection plate 220 may have second bending edges 220*a* to form a second hook member. When the massage pillow 200 is connected to the supporting base 110, the second bending edge 220*a* on an upper side of the connection plate 220 may abut against and may be located on the upper side of the first bending edge of the supporting plate. Additionally, the second bending edge 220*a* on an lower side of the connection plate 220 may abut against and may be located on the upper side of the first bending edge of the supporting plate, and the fastening screws may pass through the bending edges of the connection plate 220 and the supporting base 110 to connect the connection plate and the supporting base.

Figure 9:
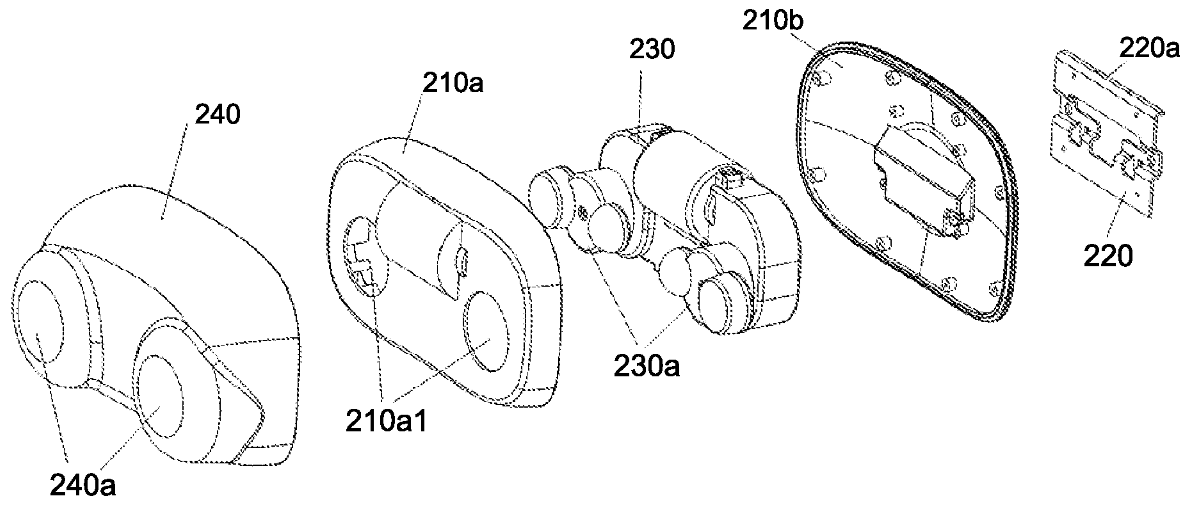
FIG. 9 is an exploded view of the massage chair of FIG. 8, according to an exemplary embodiment.

Referring to FIG. 9, the massage pillow 200 may also include a massage machine core 230 located in the massage pillow housing 210. To ensure the reliable sealing of the massage machine core 230 when mounted in the bathtub, the massage pillow 200 may also include a sealing gasket 240, where the sealing gasket 240 is covered by at least a part of the massage pillow housing 210. For example, the sealing gasket 240 may be covered by a front side, a rear side, and a lower side of the massage pillow housing 210 in a semi-enclosed structure to avoid the water flowing in the bathtub along a bottom of the massage pillow housing 210. In other embodiments, the sealing gasket 240 may be a fully enclosed structure that covers the entirety of the massage pillow housing 210. The fully enclosed structure of the sealing gasket 240 may be formed by two semi-enclosed sealing gaskets that may be connected with a push-fit. The sealing of the massage machine core 230 may be achieved by covering the massage machine core 230 with the sealing gasket 240 to avoid water ingress into the massage machine core 230.

Referring to FIG. 9 and FIG. 10, the massage pillow housing 210 may include a front cover 210*a* and a back cover 210*b* that may be removably connected with each other. The front cover 210*a* may be formed as a semi-enclosed structure with an accommodation cavity, and the back cover 210*b* may be formed as a cover structure. The front cover and the back cover may be removably connected through multiple sets of fastening screws. The sealing gasket 240 may form a semi-enclosed structure covered by the front cover 210*a*, where an end of the sealing gasket 240 is hermetically connected with the back cover 210*b*.

Referring to FIG. 10, an end of the sealing gasket 240 may form an annular sealing groove 240*a*, and an annular projection 210*b*1 may be formed on the back cover 210*b*, where the annular projection 210*b*1 may be inserted into the annular sealing groove 240*a* to achieve a hermetical connection between the two members. Using the above described structure, it may be difficult for external liquid to enter the inside of the massage machine core 230.

Referring to FIG. 9, the massage machine core 230 may include at least one massage head 230*a*. The front cover 210*a* may be formed with a passing hole 210*a*1 at a position corresponding to the massage head 230*a*, and the sealing gasket 240 may have an accommodation area 240*a* protruding forward at a position corresponding to the massage head 230*a*. The massage head 230*a* may be arranged through the passing hole 210*a*1, and the portion of the massage head 230*a* located on the front side of the passing hole 210*a*1 may be received within the accommodation area 24*a* of the sealing gasket 24. In other embodiments, an area of the front cover 210*a* corresponding to the massage head 230*a* may be formed as a flexible accommodation area to accommodate the massage head 230*a*. The sealing gasket 240 may have a protruded accommodation area or opening corresponding to the massage head 230*a*, and the flexible accommodation area of the front cover 210*a* may be accommodated within the protruded accommodation area of sealing gasket 240 or may be arranged through the opening of the sealing gasket 240.

As utilized herein with respect to numerical ranges, the terms "approximately," "relative to," "substantially," and similar terms generally mean+/−10% of the disclosed values, unless specified otherwise. As utilized herein with respect to structural features (e.g., to describe shape, size, orientation, direction, relative position, etc.), the terms "approximately," "relative to," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure. In addition, the terms "first", "second" and "third" are used for descriptive purposes only and are not to be construed as indicating or implying relative importance.

Although the figures and description may illustrate a specific order of method steps, the order of such steps may differ from what is depicted and described, unless specified differently above. Also, two or more steps may be performed concurrently or with partial concurrence, unless specified differently above.

What is claimed is:

1. A massage chair for bathing, comprising:

a chair seat including a protrusion;

a seat back including a depression; and a massage device positioned on at least one of the chair seat or the seat back, wherein the protrusion is received in the depression to couple the chair seat and the seat back together, and wherein the seat back and the chair seat are connected using a locking unit.

2. The massage chair of claim 1, wherein the protrusion and the depression have holes respectively, and when the chair seat and the seat back are coupled, the hole of the protrusion and the hole of the depression are arranged coaxially.

3. The massage chair according to claim 2, wherein when the locking unit passes through both the hole of the protrusion and the hole of the depression, the chair seat and the seat back are locked together, and wherein when the locking unit passes through only the hole of the depression, the chair seat is unlocked from the seat back.

4. The massage chair according to claim 3, wherein the locking unit comprises:

a locking shaft;

a resilient member; and a pulling twist part;

wherein the locking shaft switches between a first position and a second position under the action of the resilient member and the pulling twist part;

wherein when the locking shaft is in the first position under a force of the resilient member, the locking shaft passes through the hole of the protrusion and the hole of the depression; and wherein when the locking shaft is in the second position under a force of the pulling twist part, the locking shaft is away from the hole of the protrusion.

5. The massage chair according to claim 4, wherein the locking unit is mounted on a rear side of the seat back, wherein a mounting base is provided on a back of the seat back, wherein the pulling twist part is slidably connected to the mounting base and fixedly connected to a first end of the locking shaft, wherein the locking shaft is inserted on the mounting base and a second end of the locking shaft is provided with a connection collar, and wherein the resilient member is a compression spring and the compression spring abuts the mounting base at one end and abuts the connection collar at the other end.

6. The massage chair according to claim 1, wherein a connection suction disc is provided on the seat back and the back of the chair seat, wherein the connection suction disc comprises a suction disc body and a first connection part provided on the suction disc body, wherein the seat back and the back of the chair seat are provided with a second connection part, and wherein the first connection part and the second connection part are connected through a bidirectional fastener located between the first connection part and the second connection part.

7. The massage chair according to claim 1, wherein the seat back comprises a seat back rear housing and a seat back front housing, wherein the massage device is located in a space between the seat back rear housing and the seat back front housing and is connected to the seat back rear housing and/or the seat back front housing in a sealed manner.

8. The massage chair according to claim 7, wherein the massage device comprises a massage core body provided with at least one movable massage head, wherein the massage core body is connected to the seat back front housing using a fastening unit, wherein a sealing gasket is provided between the massage core body and the seat back front housing, and wherein the sealing gasket is covered by a front side of the massage core body.

9. The massage chair according to claim 8, wherein the massage core body comprises a connection frame, wherein the connection frame comprises a plurality of first connection holes, wherein the connection frame comprises a sealing frame, wherein the sealing frame comprises a plurality of second connection holes, wherein a plurality of third connection holes are provided on a back side of the seat back front housing, and wherein the massage core body is connected through fasteners that pass through the plurality of first connection holes, the plurality of second connection holes, and the plurality of third connection holes.

10. The massage chair according to claim 9, wherein a supporting frame is provided between the sealing gasket and the seat back front housing, wherein the supporting frame comprises a plurality of fourth connection holes, and wherein the fasteners pass through the plurality of first connection holes, the plurality of second connection holes, the plurality of third connection holes, and the plurality of fourth connection holes to connect the massage core body to the seat back front housing in a sealed manner.

11. The massage chair according to claim 10, wherein a portion of the movable massage head protrudes from the massage core body, wherein the sealing gasket comprises a raised area at a position corresponding to a moving area of the movable massage head, wherein the seat back front housing is provided with a sliding channel at a position corresponding to the moving area of the movable massage head, and wherein the raised area passes through the sliding channel.

12. A massage chair, comprising:

a massage chair body;

a supporting base slidably connected to the massage chair body;

a supporting base drive device for driving the supporting base to move up and down; and a massage pillow removably connected to the supporting base;

wherein the supporting base has a first hook member;

wherein a second hook member is provided on a back of the massage pillow; and wherein the second hook member is hooked on the first hook member and connected by a fastener unit.

13. The massage chair according to claim 12, wherein the massage chair body has a massage chair mounting area on a seat back of the massage chair, wherein the massage chair mounting area comprises a slide channel extending in a vertical direction, wherein the supporting base comprises a slide bar on a back of the supporting base, and wherein the slide bar passes through the slide channel and is connected to an output end of the supporting base drive device located on the inside of the massage chair mounting area.

14. The massage chair according to claim 13, wherein the supporting base drive device comprises a drive motor and a leadscrew nut mechanism, wherein an output shaft of the drive motor is connected to a leadscrew of the leadscrew nut mechanism, and wherein a nut of the leadscrew nut mechanism is connected to the slide bar.

15. The massage chair according to claim 12, wherein the massage pillow comprises a massage pillow housing, wherein a massage machine core is located within the massage pillow housing and a connection plate is removably coupled to a back of the massage pillow housing, and wherein the connection plate is connected to the supporting base.

16. The massage chair according to claim 15, wherein the massage pillow also comprises a sealing gasket, wherein the sealing gasket is covered by at least a portion of the massage pillow housing; wherein the massage pillow housing comprises a front cover and a back cover that are removably coupled to each other, and wherein the sealing gasket is covered by the front cover and is hermetically connected with the back cover.

17. The massage chair according to claim 16, wherein an end of the sealing gasket forms an annular sealing groove, wherein an annular projection is formed on the back cover, and wherein the annular projection is inserted into the annular sealing groove.

18. The massage chair according to claim 16, wherein the massage machine core comprises at least one massage head, wherein the front cover comprises a passing hole at a position corresponding to the massage head, and wherein the massage head is arranged through the passing hole of the front cover.

19. The massage chair according to claim 18, wherein the sealing gasket has an accommodation area protruding forward at a position corresponding to the massage head, and wherein a part of the massage head is located in the accommodation area.

* * * * *